J. G. EVENDEN.
Wood-Encased Can.
No. 5,047. Reissued Sep. 3, 1872.
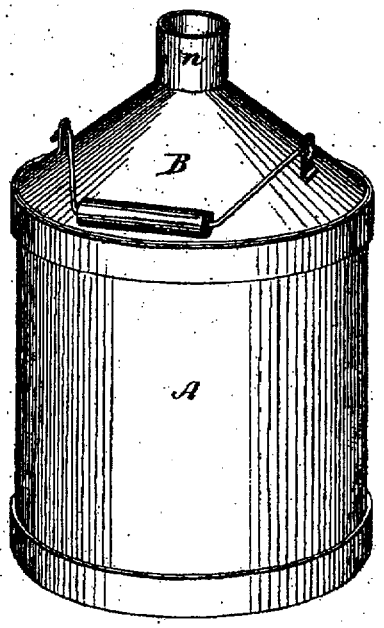
Witnesses.
C. F. Brown
N. K. Ellsworth,
Inventor.
J. G. Evenden.
by his attys.
Hill & Ellsworth

UNITED STATES PATENT OFFICE.

JOHN G. EVENDEN, OF CHICAGO, ILLINOIS, ASSIGNOR TO WALTER C. STRICKLER AND IMOGENE CAMPBELL.

DESIGN FOR WOOD-INCASED CANS.

Specification forming part of Design No. 5,023, dated June 20, 1871; reissue No. 5,047, dated September 3, 1872.

*To all whom it may concern:*

Be it known that I, JOHN G. EVENDEN, of Chicago, in the county of Cook and State of Illinois, have, by my own industry, genius, efforts, and expense, invented and produced a new, useful, and original configuration of Transportation Cans for Liquids, the nature of which is fully shown in the accompanying drawing forming a part of this specification, and representing a perspective view of a can constructed according to my new design.

My invention consists in making the body of the can cylindrical, with its sides and bottom incased in wood, and providing it with a top not incased with wood, which tapers upward from the round body and terminates at its apex in a short tubular nozzle, as hereinafter described.

In the drawing, A represents the body of the can, the same being made of sheet metal in a cylindrical form, resting on a wooden bottom, and incased around its sides in a hoop or cylinder of wood. B is the top of the can, made of sheet metal, and tapering upward from the body of the can, said top not being incased in wood; and *n* is a short tubular nozzle at the apex of the top B.

The advantages of this improved configuration are as follows, viz.: In the first place the can is neat and handsome in appearance; secondly, the can is protected by the wood covering at all points where it is exposed to injury by the ordinary accidents of transportation, but is not encumbered by the casing at those where it is not so exposed; thirdly, the tapering form of the top and the arrangement of the nozzle at the apex thereof facilitate the discharge of the liquid; fourthly, the form of the can is that which, at the smallest cost of construction and expense of materials, produces the strongest and most capacious vessel; and fifthly, the breast or top of the can is adapted to the use of an air-vent to facilitate the filling and emptying of the can.

All these advantages combined in one article, as described, render it one of the most convenient and useful transportation cans ever offered to the public.

Having thus described my invention, what I claim is—

The design for a wood incased can, substantially as herein shown and described.

JOHN G. EVENDEN.

Witnesses:

E. H. CAMPBELL,

LEWIS KIRK.